(12) United States Patent
Baumeister et al.

(10) Patent No.: US 6,914,972 B1
(45) Date of Patent: Jul. 5, 2005

(54) INTERNET TELEPHONE ADAPTER

(75) Inventors: Josef Baumeister, Borken (DE); Rolf Biedermann, Ahaus (DE)

(73) Assignee: Siemens Aktiengesellschaft, Munich (DE)

( * ) Notice: Subject to any disclaimer, the term of this patent is extended or adjusted under 35 U.S.C. 154(b) by 365 days.

(21) Appl. No.: 10/088,763

(22) PCT Filed: Sep. 19, 2000

(86) PCT No.: PCT/DE00/03259

§ 371 (c)(1),
(2), (4) Date: Mar. 20, 2002

(87) PCT Pub. No.: WO01/22709

PCT Pub. Date: Mar. 29, 2001

(30) Foreign Application Priority Data

Sep. 23, 1999 (DE) .......................... 199 45 663

(51) Int. Cl.⁷ .............................................. H04M 3/00
(52) U.S. Cl. .............................. 379/220.01; 379/221.01
(58) Field of Search ...................... 379/220.01, 221.01, 379/221.02–221.14, 114.02, 88.14, 88.13, 93.01, 142.13, 142.14, 142.15, 219, 88.17, 265.09

(56) References Cited

U.S. PATENT DOCUMENTS

| | | | |
|---|---|---|---|
| 5,838,665 A | 11/1998 | Kahn et al. | |
| 6,292,480 B1 | * 9/2001 | May | ........................... 370/352 |
| 6,714,638 B1 | * 3/2004 | Kinoshita | .............. 379/221.02 |
| 2002/0029302 A1 | * 3/2002 | Hyder et al. | ................. 709/321 |

FOREIGN PATENT DOCUMENTS

| | | |
|---|---|---|
| EP | 0 924 918 A2 | 6/1999 |
| EP | 1 011 278 A2 | 6/2000 |
| WO | WO 98/42104 | 9/1998 |
| WO | WO 98/57501 | 12/1998 |
| WO | WO 99/55030 | 10/1999 |

* cited by examiner

Primary Examiner—William J. Deane, Jr.
(74) Attorney, Agent, or Firm—Bell Boyd & Lloyd LLC

(57) ABSTRACT

An Internet telephone adapter for setting up voice/data links, where a data conversion unit for data conversion between a subscriber terminal interface and a subscriber access adapter interface allows connection both to a packet-switching communications network and to a line-switching communications network.

13 Claims, 3 Drawing Sheets

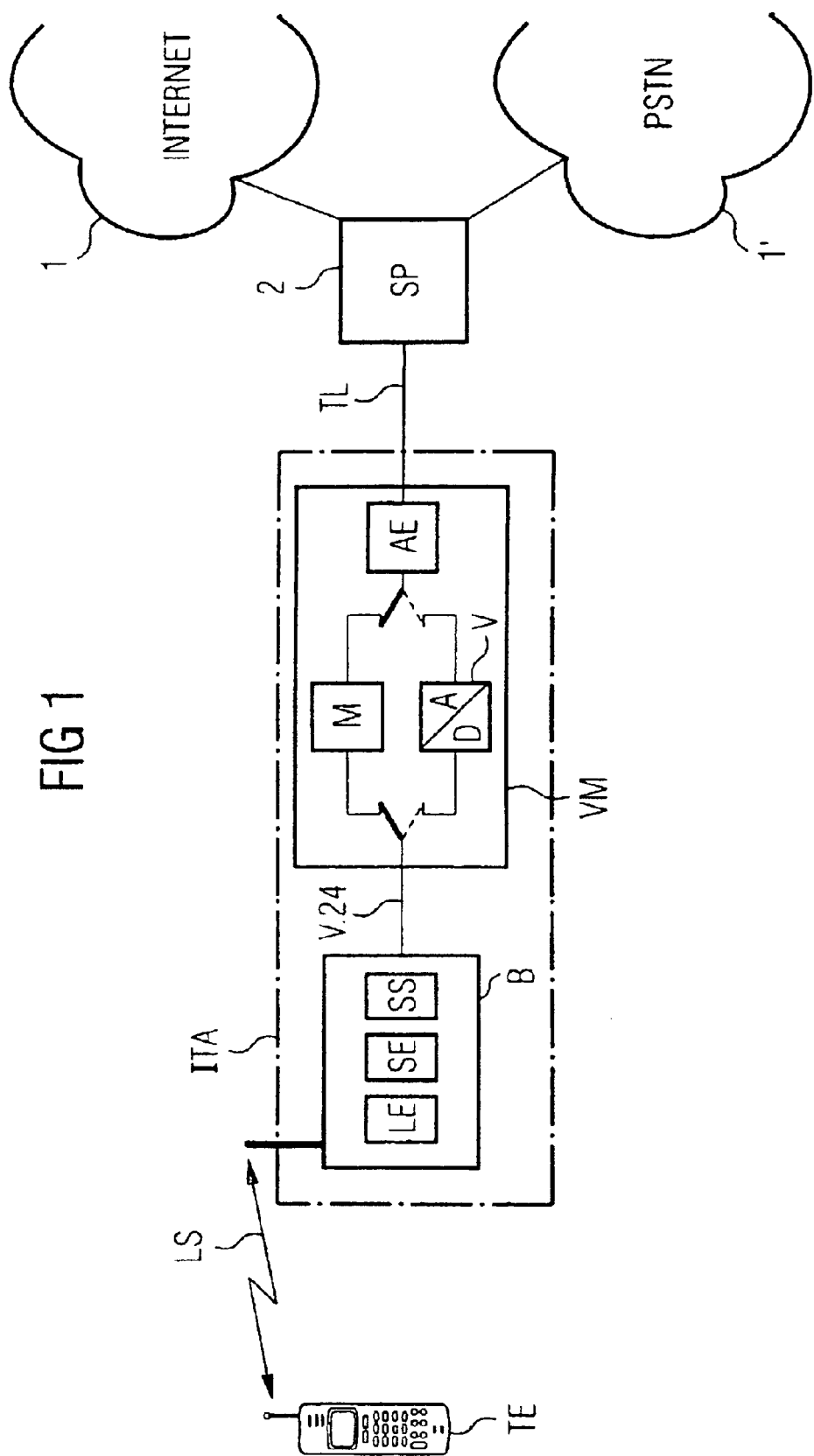

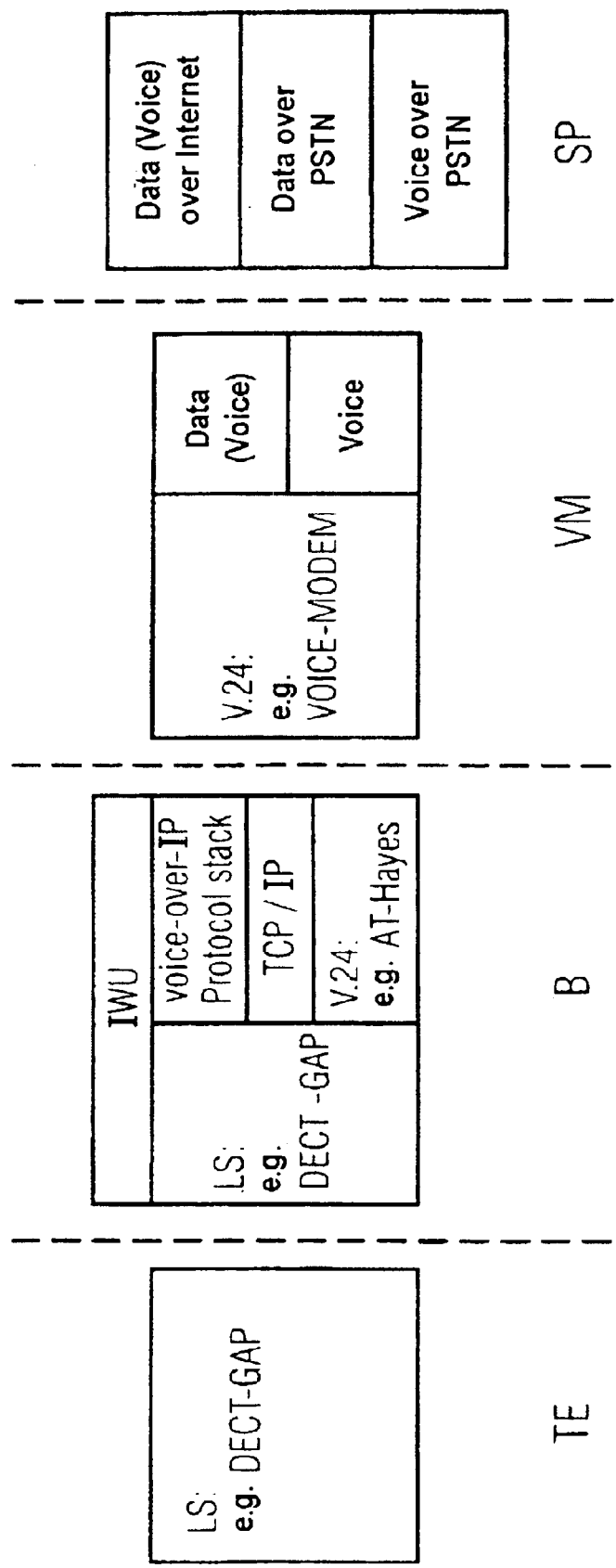

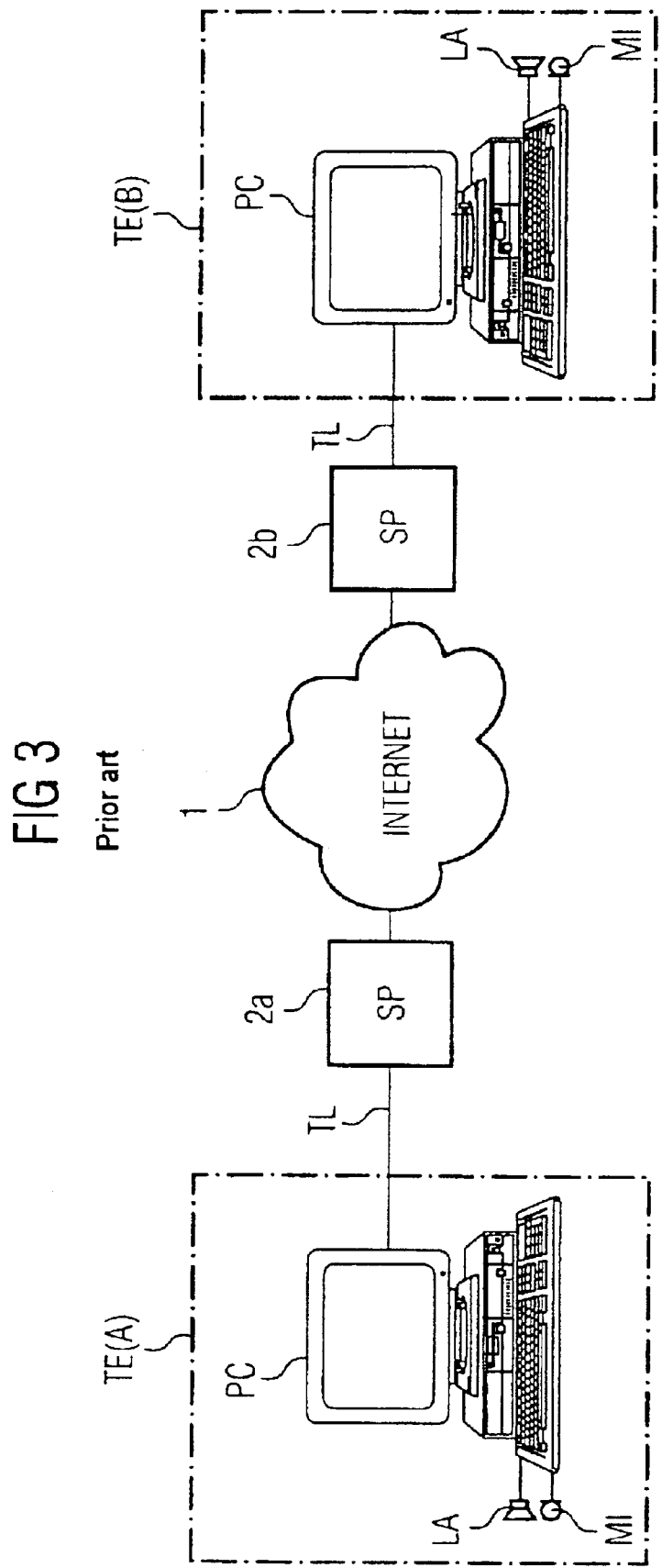

INTERNET TELEPHONE ADAPTER

BACKGROUND OF THE INVENTION

The present invention relates to an Internet telephone adapter for setting up voice/data links in line-switching networks and packet-switching networks and, in particular, to an Internet telephone adapter for cordless applications.

The volume of voice and data links in communications networks using subscriber terminals, such as telephones, mobiles and computer units (PC), is growing at a great rate both in the business sector and in the private sector. For this continuously growing communication volume, incredible sums of money are spent every year both in the business sector and in the private sector.

Voice links normally have been set up over "line-switching networks," where a direct (point-to-point) link, as it were, has been set up between the call parties. By contrast, for the data traffic, "data networks" have been used which, as packet-switching networks, packaged the data to be transferred into individual packets and sent them to a receiver via a wide variety of paths. Particularly as a result of the aggregation of a multiplicity of packet-switching networks in the "Internet," a worldwide packet-switching network has been created which can be used to transfer data, particularly in a relatively inexpensive manner.

To utilize this great difference in cost between line-switching networks and packet-switching networks,. the company Vocaltec has proposed the "Internet phone," which also permits a voice link over a packet-switching network, such as the Internet. FIG. 3 shows a simplified illustration of such an Internet phone configuration in which a voice link between two subscribers is set up over a packet-switching network 1.

In FIG. 3, a subscriber terminal TE(A) includes a computer unit PC (personal computer) which has a sound card (not shown) with a connected loudspeaker LA and a microphone MI. The computer unit PC also has a subscriber access adapter (e.g., modem), which is not shown but which is connected to a service provider 2a (SP) via a subscriber line TL. In this case, the service provider 2a, as a node in a packet-switching bidirectional communications network 1, such as the Internet, provides access to this network.

In the same way, a second call party has a subscriber terminal TE(B) having a computer unit PC and an associated sound card with a connected microphone MI and a loudspeaker LA, the computer unit PC again setting up a connection to a service provider 2b (SP), preferably via a subscriber access adapter in the form of a modem. The service provider 2b again has an access facility to the packet-switching bidirectional communications network 1.

To set up a voice link between the subscriber terminal TE(A) and the subscriber terminal TE(B) over the packet-switching network 1, the computer units PC in question are operated using a program (e.g., from Vocaltec) wherein the voice data recorded by the respective microphone are transferred, packaged into small packets, over the packet-switching network 1 and are assembled at the receiver end such that a continuous voice signal is, in turn, obtained at the loudspeaker LA. In this way, it is possible to set up an extremely inexpensive voice link throughout the world over the Internet, for example.

However, a drawback of a such a solution is that it is not possible to use conventional telephones and, hence, a connection can be set up only between two Internet telephones having appropriate computer units PC.

The document WO 98/42104 has, therefore, disclosed a system and a method for setting up a voice link over both a packet-switching network and a line-switching network which now also allow "Internet telephones" to be connected to "normal telephones." In this context, however, the Internet telephones still include a computer-assisted system with a microphone and a loudspeaker and a specifically aligned local service provider for coupling both the line-switching data and the packet-switching data.

The document U.S. Pat. No. 5,838,665 describes another adapter apparatus which can be used to couple the Internet telephone systems described above to conventional telephones. In this context, connecting a normal telephone to an "Internet telephone system" makes it possible to provide, by way of example, multiparty services, etc., between the different systems. However, a drawback with this system is that a computer assisted terminal unit (PC) still produces the "Internet telephone," which is why it is rejected by a large number of users.

The present invention is, therefore, directed toward providing an Internet telephone adapter for setting up voice/data links in line-switching networks and packet-switching networks which is both inexpensive and user friendly.

SUMMARY OF THE INVENTION

Pursuant to the present invention, use is made of a base unit having a transfer method evaluation unit which, on the basis of the type of voice/data link identified, performs data conversion between the data on a subscriber terminal interface and the packet-switching network or the line-switching network results in an Internet telephone adapter which is extremely simple to use and, without using a complicated computer system (PC), turns any conventional subscriber terminal into a terminal which allows a voice/data link both over line-switching networks and over packet-switching networks.

Preferably, the subscriber terminal interface includes a DECT interface based on the ETSI standard, and the standard data interface includes a serial V.24 interface based on the ITU standard. Such an embodiment already has been implemented, by way of example, in the Gigaset M101 data terminal from the company Siemens, which allows conventional cordless telephones to be converted into cordless Internet telephones via a slight modification to the base station operating as base unit. In this context, the subscriber access adapter used preferably can be an analog voice modem or a digital ISDN access adapter.

Preferably, the data conversion in the base unit for a connection over the packet-switching network involves performing TCP/IP data protection, which results in an alignment with the Internet.

Particularly when a cordless application is used, the data conversion involves converting the received voice/data information from a DECT-GAP standard to the Voice-Over-IP protocol and vice versa.

Additional features and advantages of the present invention are described in, and will be apparent from, the following Detailed Description of the Invention and the Figures.

BRIEF DESCRIPTION OF THE FIGURES

FIG. 1 shows a simplified illustration of an Internet telephone system with an inventive Internet telephone adapter.

FIG. 2 shows a schematic illustration of a protocol structure for the system shown in FIG. 1.

FIG. 3 shows a simplified illustration of an Internet telephone system based on the prior art.

DETAILED DESCRIPTION OF THE INVENTION

FIG. 1 shows a simplified illustration of an Internet telephone system for setting up a voice/data link over a line-switching network 1' or a packet-switching network 1. In FIG. 1, a subscriber terminal TE is connected via a subscriber terminal interface LS to the Internet telephone adapter ITA, which is itself connected to a service provider 2 (SP) via a subscriber line TL. In FIG. 1, the service provider 2 allows connection both to a packet-switching network'1, which preferably includes the Internet, or to a line-switching network 1' , which preferably includes a public telephone network (Public Switched Telephone Network, PSTN).

As has already been described above, voice and data are packaged into packets in the packet-switching network 1 and are sent to the network 1 using a destination address. When they have arrived at the destination address, the individual packets are assembled again according to their prescribed order and are output on a subscriber (not shown). By contrast, in the line-switching network 1' , a direct connection is set up between the respective subscribers, and the information is transferred in the form of voice or data.

The Internet telephone adapter ITA essentially includes a base unit B which is connected to a subscriber access adapter VM via a standard data interface V.24.

In the preferred exemplary embodiment shown in FIG. 1, the subscriber terminal TE includes a cordless telephone for setting up an air interface LS based on the ETSI standard DECT. Since such a subscriber terminal TE is able to transmit only voice, the air interface LS is based on the DECT-GAP standard. At the opposite end, the air interface LS shown in FIG. 1 is set up by a base station which acts as a base unit B and preferably corresponds essentially to the cordless GIGASET M101 data terminal from Siemens. Such a base unit essentially includes an air interface unit LE for setting up the air interface LS, a data interface unit SS for setting up the standard data interface V.24 , and a control unit SE which controls both the air interface unit LE and the data interface unit SS. Preferably, the standard data interface V.24 used is a serial interface based on ITU-V.24 standard. It is also possible to use any other interface, however, such as parallel interfaces, USB, fire wire, etc.

On the standard data interface V.24 , the subscriber access adapter VM is connected in order to set up a connection to the service provider 2 (SP). Preferably, the subscriber access adapter VM includes an "analog voice modem," which permits the transfer of information both in a data format using a modem M or in a voice format using a digital/analog converter unit V (voice). In this context, the respective transfer is selected via a selection unit AE, which preferably can be programmed with the aid of standardized AT-Hayes commands using the standard data interface V.24.

To set up an "Internet voice/data link," it is necessary for a multiplicity of functions, preferably performed by the control unit SE, to be implemented in the base unit B. Particularly when the data terminal GIGASET M101 is used, the inventive Internet telephone adapter ITA can be produced by slightly modifying (software, firmware) the base unit B and using a conventional voice modem VM. In this context, the control unit SE in the base unit B needs to implement a dialing evaluation unit which makes it possible to distinguish a normal voice/data link (i.e., a link over the line-switching network 1'), from an Internet voice/data link (i.e., a link over the packet-switching network 1). For this purpose, a number plan is designed, for example, which makes it possible to make this distinction using currently available dialing digits (such as 0 to 9, *, #).

In the case of an Internet voice/data link initiated with "#," for example, a selection to be produced by the base unit B includes the IP address (IP, Internet protocol) of the required call party. In this case, the base unit B also uses the standard data interface V.24 to select a modem mode on the voice modem, as a result of which the information is sent in the data format via the modem M to the service provider 2 with the IP address produced.

If, on the other hand, a normal voice/data link is to be set up (e.g., a normal telephone number is dialed without "#" in front), then the base unit B needs to actuate the selection unit AE in the voice modem VM such that the converter unit V is selected and the voice data are forwarded transparently, as it were, to the service provider 2. Since there is no I? address in this case, the service provider 2 would set up the link over the network 1'.

In another case (not shown), the air interface LS also can be used to connect a data subscriber terminal which transmits exclusively data. These data are, in turn, transmitted by the voice modem VM using the modem M, but with no IP address being added. The IP address now can be used by the service provider 2 to establish whether transmission is to be produced using the packet-switching network I (i.e., over the Internet), or a conventional connection over the line-switching network 1'.

To set up an Internet voice/data link, however, it is not yet sufficient to add an IP address on the basis of the evaluated dialing digits from the subscriber terminal TE. Instead, the base unit B needs to set up data conversion between the air interface LS and the protocol required for the packet-switching network 1.

FIG. 2 shows a schematic illustration of a protocol structure for the Internet telephone system shown in FIG. 1. FIG. 2 describes the protocol structure for the preferred exemplary embodiment including a DECT-GAP mobile part or subscriber terminal TE and an AT-Hayes voice modem VM connected via a serial V.24 interface. Accordingly, a DECT-GAP protocol is used between subscriber terminal TE and base unit B on the air interface LS. The control unit SE in the base unit B implements a data conversion unit IWU (interworking unit) whose task is to connect the different protocol domains to one another. More precisely, the data conversion unit IWU in the base unit B monitors connection setup on the air interface side using its associated DECT-GAP protocol, with setup of a connection being accepted and the dialing which comes from the cordless subscriber terminal TE (i.e., the dialing digits 0 to 9, *, #, etc.), being evaluated. When an Internet voice/data link is identified (e.g., "#" in front), the base unit B switches the voice modem VM to modem mode, and the modem M is prompted to dial up the service provider 2. Once the connection has been set up, the data sent by the air interface LS are converted on the basis of the Voice-Over-IP protocol and are sent, protected via TCP/IP data protection (transfer control protocol/Internet protocol), to the IP address obtained in the dialing.

Particularly when the subscriber access adapter VM includes a voice modem, it is possible to set up not only the Internet/data link but also a normal voice/data link over the line-switching network 1'. In this case, for example when the dialing digit "#" is not included, the Internet protocols (TCP/IP, Voice-Over-IP protocol) are avoided by the data conversion unit IWU and the number, or dialing digits, received from the cordless subscriber terminal TE are forwarded to the voice modem VM using AT-Hayes commands, for example, in order to prompt the voice modem VM to dial this number. In this case, the information sent by the subscriber terminal TE is forwarded as voice data by the service provider 2 over the line-switching network 1'.

In order, on the other hand, to be able to receive an incoming internal voice/data link, the Internet telephone adapter ITA naturally needs to be "online." For this purpose, the service provider 2 can provide certain services which allow not only dialing into the Internet or packet-switching network 1, but also calling from the packet-switching network 1.

In this way, the subscriber terminal TE also can be reached constantly via an Internet/data link.

The Internet telephone adapter described above has been described with reference to FIGS. 1 and 2 using a cordless subscriber terminal and an analog subscriber access adapter. It is not limited to these, however, but rather includes any other subscriber terminal interfaces for connecting subscriber terminals, such as data terminals, corded telephones, etc. In this context, the air interface used is preferably a DECT interface based on the ETSI standard. However, it is also possible to use, by way of example, the PHS air interface customary in Japan or the generally known "Bluetooth" air interface.

Alternatively, instead of the analog subscriber access adapter (voice modem), it is also possible to use a digital subscriber access adapter, such as an ISDN-TA, etc. In FIG. 1, the Internet telephone adapter includes a base unit B and a subscriber access adapter VM which is of discrete design. The subscriber access adapter also can be incorporated directly in the base unit B, however. Preferably, the base unit B used can be the GIGASET M101 data terminal. However, it is also possible to use any other base unit which allows data conversion between the respective protocol domains as a result of an additional modification.

Although the present invention has been described with reference to specific embodiments, those of skill in the art will recognize that changes may be made thereto without departing from the spirit and scope of the present invention as set forth in the hereafter appended claims.

What is claimed is:

1. An Internet telephone adapter for setting up voice/data links in line-switching networks and packet-switching networks, comprising:
   a base unit for setting up a subscriber terminal interface and a standard data interface;
   a subscriber access adapter for connecting the base unit to a service provider for the line-switching networks and the packet-switching networks; and
   a transfer method evaluation unit in the base unit which, based on a type of voice/data link identified, performs data conversion between the data on the subscriber terminal interface and the respective packet-switching network and line-switching network.

2. An Internet telephone adapter for setting up voice/data links in line-switching networks and packet-switching networks as claimed in claim 1, wherein the subscriber terminal interface is an air interface and the standard data interface is a serial interface.

3. An Internet telephone adapter for setting up voice/data links in line-switching networks and packet-switching networks as claimed in claim 2, wherein the air interface is one of a DECT interface and a GSM interface standardized on the basis of ETSI, and the serial interface is one of a V.24 interface and a USB interface standardized on the basis of ITU.

4. An Internet telephone adapter for setting up voice/data links in line-switching networks and packet-switching networks as claimed in claim 2, wherein the air interface is one of a Bluetooth interface and a PHS interface.

5. An Internet telephone adapter for setting up voice/data links in line-switching networks and packet-switching networks as claimed in claim 1, wherein the subscriber access adapter has one of an analog voice modem and a digital ISDN adapter.

6. An Internet telephone adapter for setting up voice/data links in line-switching networks and packet-switching networks as claimed in claim 5, wherein the subscriber access adapter has a selection unit for selecting data transfer in one of a data format and a voice format.

7. An Internet telephone adapter for setting up voice/data links in line-switching networks and packet-switching networks as claimed in claim 1, wherein, for an outgoing call, the base unit actuates the subscriber access adapter and, for an incoming call, the subscriber access adapter actuates the base unit for a type of voice/data link.

8. An Internet telephone adapter for setting up voice/data links in line-switching networks and packet-switching networks as claimed in claim 1, wherein the base unit produces an IP address for a required call party when a voice/data link is identified for a packet-switching network.

9. An Internet telephone adapter for setting up voice/data links in line-switching networks and packet-switching networks as claimed in claim 1, wherein the data conversion in the transfer method evaluation unit for the packet-switching network includes TCP/IP data protection.

10. An Internet telephone adapter for setting up voice/data links in line-switching networks and packet-switching networks as claimed in claim 1, wherein the data conversion in the transfer method evaluation unit for the packet-switching network includes a Voice-Over-IP protocol.

11. An Internet telephone adapter for setting up voice/data links in line-switching networks and packet-switching networks as claimed in claim 1, wherein a standardized cordless subscriber terminal is registered on the base unit.

12. An Internet telephone adapter for setting up voice/data links in line-switching networks and packet-switching networks as claimed in claim 1, wherein, when a voice/data link is identified for a line-switching network, the base unit actuates the subscriber access adapter such that the service provider connected thereto selects the line-switching network for a voice/data link.

13. An Internet telephone adapter for setting up voice/data links in line-switching networks and packet-switching networks as claimed in claim 1, wherein the subscriber access adapter is incorporated in the base unit.

* * * * *